(12) United States Patent
Olson

(10) Patent No.: US 7,832,142 B1
(45) Date of Patent: Nov. 16, 2010

(54) NUTRIENT DISPENSING SYSTEM AND METHOD OF USE

(76) Inventor: Perry Jon Olson, 229 Woodleigh Rd., Knotts Island, NC (US) 27950

( * ) Notice: Subject to any disclaimer, the term of this patent is extended or adjusted under 35 U.S.C. 154(b) by 338 days.

(21) Appl. No.: 12/218,393

(22) Filed: Jul. 15, 2008

(51) Int. Cl.
*A01G 27/00* (2006.01)

(52) U.S. Cl. .................. 47/48.5; 47/62 R; 137/624.11; 239/70

(58) Field of Classification Search ........... 47/59 R, 47/62 R–62 N, 48.5; 239/70; 137/624.11, 137/624.12, 409, 410, 412; 222/14–22, 61–67, 222/638, 650, 252, 263
See application file for complete search history.

(56) References Cited

U.S. PATENT DOCUMENTS

| 4,300,311 | A | * | 11/1981 | Marchant | .................. 47/62 R |
| 4,527,353 | A | * | 7/1985 | Newby | ........................ 47/59 R |
| 4,561,566 | A | * | 12/1985 | Slobodnik | .................... 222/56 |
| 2005/0133613 | A1 | * | 6/2005 | Mayer et al. | ................. 239/63 |

* cited by examiner

*Primary Examiner*—Rob Swiatek
*Assistant Examiner*—Danielle Clerkley
(74) *Attorney, Agent, or Firm*—Ted Masters

(57) ABSTRACT

A nutrient dispensing system which connects to a pressurized water supply includes a gravity dispenser, a pressure dispenser, and a valve which selectively connects the pressurized water supply to one of the gravity dispenser and the pressure dispenser. In a first mode of operation, gravity dispenser only is used. In a second mode of operation, pressure dispenser only is used. And in a third mode of operation the gravity dispenser and the pressure dispenser are used simultaneously.

10 Claims, 4 Drawing Sheets

NUTRIENT DISPENSING SYSTEM AND METHOD OF USE

TECHNICAL FIELD

The present invention pertains generally to nutrient dispensers for feeding irrigation systems and growing machines, and more particularly to a nutrient dispensing system which contains both a gravity dispenser and a pressure dispenser.

BACKGROUND OF THE INVENTION

One of the problems encountered when growing plants with self watering pots is the continual human filling and accurate mixing of the reservoir with nutrient solution. It would therefore be desirable to have an automatic nutrient dispenser capable of feeding organic or conventional plant nutrient including fertilizer. The price premiums paid for organic fruits and vegetables compared to conventional growing of fruits and vegetables makes growing organic with self watering pots important. Organic sales of fresh fruits and vegetables are estimated to reach 8.5 billion in 2010, an increase of more then 300 percent over sales in 2000 according to the Nutrition Business Journal.

Self watering pots are used to grow fresh fruits and vegetables. Self watering pots are known to regulate the nutrient solution into the pots using a variety of devices and techniques including liquid level float valves and flow control devices. The nutrient flow from these control devices enters the pot allowing nutrient solution to feed by capillary action generally from the base of the pot to the plant. The nutrient supply to the liquid level control device is known to be a storage reservoir located above the control device. This reservoir uses gravity to feed the nutrient to the liquid level control device then to the plants. Reservoirs for supplying liquid nutrient to the self watering control devices include buckets, drums or similar water storage containers. These reservoirs are filled with water and nutrient solution including water soluble organic and conventional fertilizer. A liquid level float valve connected to a pressurized water supply is known to maintain the reservoir liquid level acting as a cistern. This method of filling the reservoir will dilute the nutrient solution previously mixed in the reservoir resulting in variable nutrient solution concentration feeding the plants.

Other systems utilize a pressurized water supply rather than a gravity-feed supply.

BRIEF SUMMARY OF THE INVENTION

The present invention is directed to a nutrient dispensing system which contains both gravity and pressure dispensers, and is particularly useful in accurate automatic dispensing of organic and conventional plant nutrient including fertilizer to feed self watering pots and replenishing hydroponic reservoirs. The present invention is capable of feeding self watering pots, soaker line systems, and drip emitter systems without purchasing an additional electronic irrigation timer or piston powered dosing dispenser. This novel approach of combining methods of automatic nutrient feeding into one system using a common electronic irrigation timer is designed to give flexibility for the grower.

In accordance with a preferred embodiment of the invention, a nutrient dispensing system which connects to a pressurized water supply includes a gravity dispenser, a pressure dispenser, and a valve which connects one of the gravity dispenser and the pressure dispenser to the pressurized water supply.

In accordance with an aspect of the invention, the nutrient dispensing system includes (1) a first mode of operation in which the gravity dispenser only is in use, (2) a second mode of operation in which the pressure dispenser only is in use, and (3) a third mode of operation in which the gravity dispenser and said pressure dispenser are simultaneously in use.

In accordance with another aspect of the invention, the nutrient dispensing system includes exactly one timer which controls water flow from the pressurized water supply to both the gravity dispenser and the pressure dispenser.

In accordance with another aspect of the invention, the gravity dispenser includes a nutrient tank for storing a nutrient. A gravity float switch is disposed in the nutrient tank and provides a gravity full signal when the nutrient tank is full of nutrient. The gravity full signal is routed to the timer causing the timer to turn off.

In accordance with another aspect of the invention, the timer only causes water to flow from the pressurized water supply to the gravity dispenser during selectable pre-determined periods.

In accordance with another aspect of the invention, a supplemental pressurized water supply is connected to the nutrient tank.

In accordance with another aspect of the invention, the pressure dispenser includes a nutrient reservoir for storing the nutrient. A pressure float switch is disposed in the nutrient reservoir and provides a pressure full signal when the nutrient reservoir is full of the nutrient. The pressure full signal is routed to the timer causing the timer to turn off.

In accordance with another aspect of the invention, the timer is turned on thereby causing water to flow from the pressurized water supply to the pressure dispenser unless the pressure full signal is received.

In accordance with another aspect of the invention, the pressure dispenser includes a plurality of pots, each of which are connected to the nutrient reservoir.

Other aspects of the present invention will become apparent from the following detailed description, taken in conjunction with the accompanying drawings, which illustrate, by way of example, the principles of the invention.

DETAILED DESCRIPTION OF THE INVENTION

Figure 1:
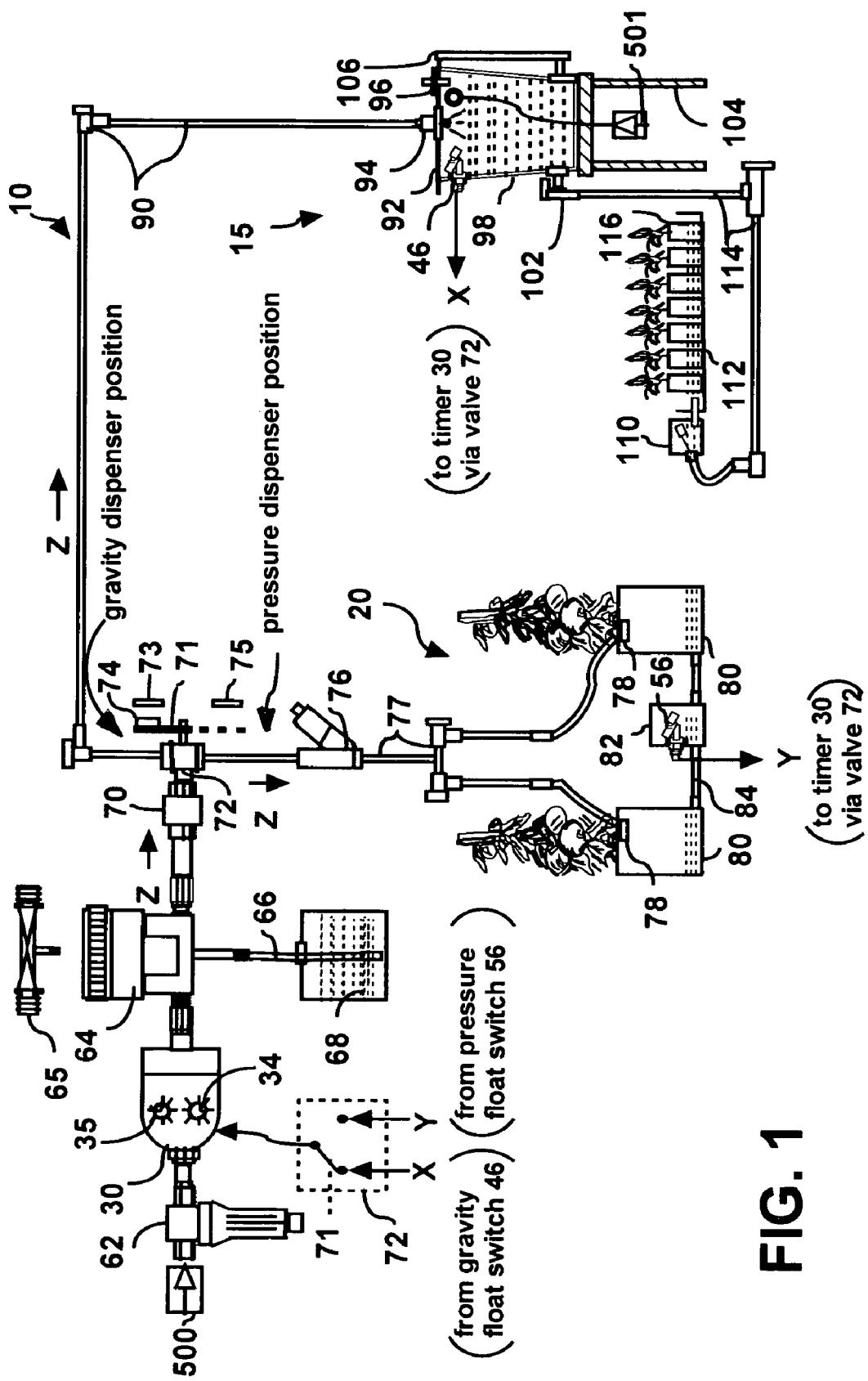
FIG. 1 is a diagram of a nutrient dispensing system in accordance with the present invention.

Referring initially to FIG. 1, there is illustrated a diagram of a nutrient dispensing system in accordance with the present invention, generally designated as 10. Nutrient dispensing system 10 connects to a pressurized water supply 500 which is not part of the system. Nutrient dispensing system 10 includes a gravity dispenser 15 which dispenses a nutrient liquid Z to plants by gravity feed, and a pressure dispenser 20 which dispenses nutrient liquid Z to plants using the pressure of pressurized water supply 500. A valve 72 having a handle 71 selectively connects pressurized water supply 500 to one of gravity dispenser 15 and pressure dispenser 20. Nutrient dispensing system 10 has three modes of operation. In a first mode of operation (mode 1), gravity dispenser 15 only is in use. In mode 1, handle 71 of valve 72 is rotated to a gravity dispenser 15 position (up as shown in FIG. 1), thereby connecting pressurized water supply 500 to gravity dispenser 15. In a second mode of operation (mode 2), pressure dispenser 20 only is in use. In mode 2, handle 71 of valve 72 is rotated to a pressure dispenser 20 position (down as shown dashed in FIG. 1), thereby connecting pressurized water supply 500 to pressure dispenser 20. In a third mode of operation (mode 3), gravity dispenser 15 and pressure dispenser 20 are simultaneously in use. In mode 3, handle 71 of valve 72 is first rotated to the gravity dispenser 15 position to fill a nutrient tank 98 (see discussion below), and then rotated to the pressure dispenser 20 position.

Components common to gravity dispenser 15 and pressure dispenser 20 are strainer 62 connected before an electronic tap timer 30 which controls water flow from pressurized water supply 500. In an embodiment of the invention, nutrient dispensing system 10 includes exactly one timer 30 which controls water flow from pressurized water supply 500 to both gravity dispenser 15 and pressure dispenser 20. A nutrient concentrate is stored in tank 68 and is drawn through a feed tubing 66 and mixed with water from pressurized water supply 500 in a piston nutrient injector 64 to produce liquid nutrient Z. It is noted however, that the present invention is not limited to piston nutrient injectors 64; a venturi nutrient injector 65 may be used as an alternate. The ratio of concentrated nutrient to water is predetermined by the model of the nutrient injector selected. A one way check valve 70 prevents nutrient Z from back flowing into the outlet of the piston nutrient injector 64.

Gravity dispenser 15 also includes a nutrient tank 98 for storing a nutrient Z. A gravity float switch 46 is disposed in nutrient tank 98, and provides a gravity full signal X when nutrient tank 98 is full of nutrient Z. Gravity full signal X is routed to timer 30 causing timer 30 to turn off (refer also to FIG. 3 and the associated discussion). When timer 30 is turned off, water from pressurized water supply 500 is not delivered to either gravity dispenser 15 or pressure dispenser 20. Conversely, when timer 30 is turned on, water from pressurized water supply 500 is delivered to either gravity dispenser 15 or pressure dispenser 20 (depending upon the position of handle 71 of valve 72). It is noted that gravity full signal X is routed to timer 30 via valve 72. This is shown functionally in FIG. 1, and electrically in FIG. 3. For gravity full signal X to reach timer 30 and turn it off, handle 71 of valve 72 must be in the gravity dispenser 15 position (up as shown in FIG. 1).

For mode 1 operation, gravity dispenser 15 is selected by rotating handle 71 of valve 72 to the up gravity dispenser position. With timer 30 initially on, nutrient Z flows through the fitted piping or tubing 90, attached to an inverted sprinkler head 94 fixed to the nutrient tank cover 92. Gravity feed nutrient Z sprays into the nutrient tank 98 elevated by stand 104 for storing a nutrient Z (also refer to FIG. 2 and the associated discussion). Displaced air from the filling escapes through the vent 96. Clear tubing 106 connected to the nutrient tank 98 indicates the nutrient Z level. Gravity float switch 46 is deposed in nutrient tank 98, and provides a gravity full signal X when nutrient tank 98 is full of nutrient Z. Gravity full signal X is routed to timer 30 causing it to turn off and stop the flow of water so that nutrient tank 98 will not overflow. Valve 102 releases the stored nutrient Z through fitted piping or tubing 114 for bottom feeding plants contained in pots 116 sitting in tray 112 and feed by means of a float valve 110. Plants contained in pots 116 consume nutrient Z supplied from nutrient tank 98. Even with timer 30 off, nutrient tank 98 will continue to feed plants in pots 116 so long as there is nutrient Z remaining in the tank. After a while, the plant consumption causes the nutrient Z level in nutrient tank 98 to drop. The drop in nutrient Z level causes gravity float switch 46 to change state and not provide a gravity full signal X to timer 30. This allows timer 30 to turn back on thereby re-connecting pressurized water supply 500 and refilling nutrient tank 98. This on/off cycle repeats as the plant in pots 116 consume nutrient Z. It is noted however, that timer 30 only causes water to flow from pressurized water supply 500 to gravity dispenser 98 during selectable pre-determined periods. That is, timer 30 is manually set to come on at periodic intervals for a set length of time, and then turn back off. As such, in the above description of mode 1, if timer 30 happens to be off when nutrient Z level drops and removes gravity full signal X, then the refilling of nutrient tank 98 must wait unit timer 30 turns back on again (refer to FIG. 3 and the associated discussion). It is noted that gravity full signal X is routed to timer 30 via valve 72. This is shown functionally in FIG. 1, and electrically in FIG. 3. For gravity full signal X to reach timer 30 and turn it off, handle 71 of valve 72 must be in the gravity dispenser 15 position (up as shown in FIG. 1). It is further noted that, depending upon the position of valve 72, only one of pressure full signal X Y and gravity full signal X can reach timer 30.

Now turning to pressure dispenser 20 which includes a nutrient reservoir 82 for storing nutrient Z. A pressure float switch 56 is disposed in nutrient reservoir 82, and similar to gravity float switch 46, provides a pressure full signal Y when nutrient reservoir 82 is full of nutrient Z. Pressure full signal Y is routed to timer 30 causing said timer 30 to turn off (also refer to FIG. 3 and the associated discussion).

For mode 2 operation, pressure dispenser 20 is selected by rotating handle 71 of valve 72 down to the pressure dispenser position. In mode 2, timer 30 is manually turned on causing water to flow from pressurized water supply 500 to pressure dispenser 20 unless pressure full signal Y is received. That is, in mode 2 timer 30 is not set to come on at periodic intervals for set lengths of time at in mode 1. Rather timer 30 is always on unless turned off by pressure full signal Y. Pressurized nutrient Z flows through pressure regulator 76 selected based on recommended operating pressures for drip emitters 78 connected to fitted piping or tubing 77. Plants are top feed from drip emitters 78 feeding pots 80 each connected to fitted piping or tubing 84 connected to nutrient reservoir 82 for storing nutrient Z. Pots 80 have no drain holes in the bottom. It is noted that, pressure dispenser 20 includes a plurality of pots 80, each of which are connected to nutrient reservoir 82.

A pressure float switch 56 is disposed in nutrient reservoir 82. Pressure float switch 56 provides a pressure full signal Y when nutrient reservoir 82 is full of nutrient Z. The pressure full signal Y is routed to timer 30 it to turn off. The grower selects the on position for timer 30 by turning rotary switch 35. The pressurized dispenser 20 is not limited to drip emitters 78. Bottom feeding of pots 80 through fitted piping or tubing 84 is caused when connecting fitted piping or tubing 77 directly to nutrient reservoir 82 without drip emitters 78. Plants contained in pots 80 consume nutrient Z supplied from the drip emitters 78. After a while, the plant consumption causes the nutrient Z level in nutrient reservoir 82 to drop. The drop in nutrient Z level causes pressure float switch 56 to change state and not provide a pressure full signal Y to timer 30. This allows timer 30 to turn back on thereby re-connecting pressurized water supply 500 to pressure dispenser 20. This on/off cycle repeats as the plants in pots 80 consume nutrient Z. It is noted that pressure full signal Y is routed to timer 30 via valve 72. This is shown functionally in FIG. 1, and electrically in FIG. 3. For pressure full signal Y to reach timer 30 and turn it off, handle 71 of valve 72 must be in the pressure dispenser 20 position (down as shown in FIG. 1). It is further noted that, depending upon the position of valve 72, only one of pressure full signal X and gravity full signal Y can reach timer 30.

For mode 3 operation, gravity dispenser 15 and pressure dispenser 20 are simultaneously used. In an example of mode 3 operation, the grower would use gravity dispenser 15 to feed smaller plants contained in pots 116 using full or half strength nutrient Z. Larger plants contained in pots 80 are feed from pressure dispenser 20 using full strength nutrient Z. The grower would view sight tubing 106 every three or four days to determine when the nutrient tank 98 needs refilling. Sight tubing 106 can be observed while operating handle 71 of valve 72. To refill nutrient tank 98, the grower rotates handle 71 of valve 72 to gravity dispenser 15 position (up in FIG. 1), and ensures that timer 30 is on. When nutrient tank 98 is refilled, the grower then rotates handle 71 of valve 72 to the pressure dispenser 20 position (down in FIG. 1). Now pressure dispenser 20 and gravity dispenser 15 are simultaneously feeding plants with nutrient Z, with pressure dispenser operating as in mode 2. However, since gravity dispenser 15 is no longer connected to pressurized water supply 500, the grower must periodically monitor the nutrient Z level in nutrient tank 98. When the level is low, handle 71 of valve 72 is again rotated to the gravity dispenser 15 position to refill nutrient tank 98, and after filling, returned to the pressure dispenser 20 position. This cycle is repeated as necessary.

Referring to FIG. 1, in terms of use, a method for feeding plants includes:

(a) providing a pressurized water supply 500;

(b) providing a nutrient dispensing system 10 connected to pressurized water supply 500, nutrient dispensing system 10 including:

a gravity dispenser 15;

a pressure dispenser 20;

a valve 72 which selectively connects pressurized water supply 500 to one of gravity dispenser 15 and pressure dispenser 20; and, (c) using valve 72 to connect pressurized water supply 500 to one of gravity dispenser 15 and pressure dispenser 20.

The method further including (mode 1 operation):

in step (b), nutrient dispensing system 10 further including;

a nutrient Z;

a timer 30 which controls water flow from pressurized water supply 500;

gravity dispenser 15 including a nutrient tank 98 for storing nutrient Z;

a gravity float switch 46 disposed in nutrient tank 98, gravity float switch 98 providing a gravity full signal X when nutrient tank 98 is full of nutrient Z;

gravity full signal X routed to timer 30 causing timer 30 to turn off;

ensuring that timer 30 is turned on thereby allowing water to flow from pressurized water supply 500;

in step (c), using valve 72 to connect pressurized water supply 500 to gravity dispenser 15 thereby causing nutrient Z to flow into nutrient tank 98; and, when nutrient tank 98 is full of nutrient Z, gravity full signal X causing timer 30 to turn off.

The method further including (mode 1 operation):

in step (b), timer 30 causing water to flow from pressurized water supply 500 to gravity dispenser 15 during selectable pre-determined periods.

The method further including (mode 2 operation):

in step (b), nutrient dispensing system 10 further including;

a nutrient Z;

a timer 30 which controls water flow from pressurized water supply 500;

pressure dispenser 20 including a nutrient reservoir 82 for storing a nutrient Z;

a pressure float switch 56 disposed in nutrient reservoir 82, pressure float switch 56 providing a pressure full signal Y when nutrient reservoir 82 is full of nutrient Z; and, pressure full signal Y routed to timer 30 and causing timer 30 to turn off;

ensuring that timer 30 is turned on thereby allowing water to flow from pressurized water supply 500;

in step (c), using valve 72 to connect pressurized water supply 500 to pressure dispenser 20, thereby causing nutrient Z to flow into nutrient reservoir 82; and, when nutrient reservoir 82 is full of nutrient Z, pressure full signal Y causing timer 30 to turn off.

The method further including (mode 2 operation):

in step (b), timer 30 being turned on causing water to flow from pressurized water supply 500 to pressure dispenser 20 unless pressure full signal Y is received.

The method further including (mode 3 operation):

in step (b), nutrient dispensing system 10 further including;

a nutrient Z;

gravity dispenser 15 including a nutrient tank 98 for storing nutrient Z;

ensuring that timer 30 is turned on thereby allowing water to flow from pressurized water supply 500;

in step (c), using valve 72 to connect pressurized water supply 500 to gravity dispenser 15 thereby causing nutrient Z to flow into nutrient tank 98; and, when nutrient tank 98 is full, using valve 72 to connect pressurized water supply 500 to pressure dispenser 500.

The method further including (mode 3 operation):

periodically monitoring a level of nutrient Z in nutrient tank 98;

when the level of nutrient has dropped to a predetermined level, using valve 72 to connect pressurized water supply 500 to gravity dispenser 15 thereby causing nutrient Z to flow into nutrient tank 98; and, when nutrient tank 98 is full, using valve 72 to connect pressurized water supply 500 to pressure dispenser 20.

Figure 2:
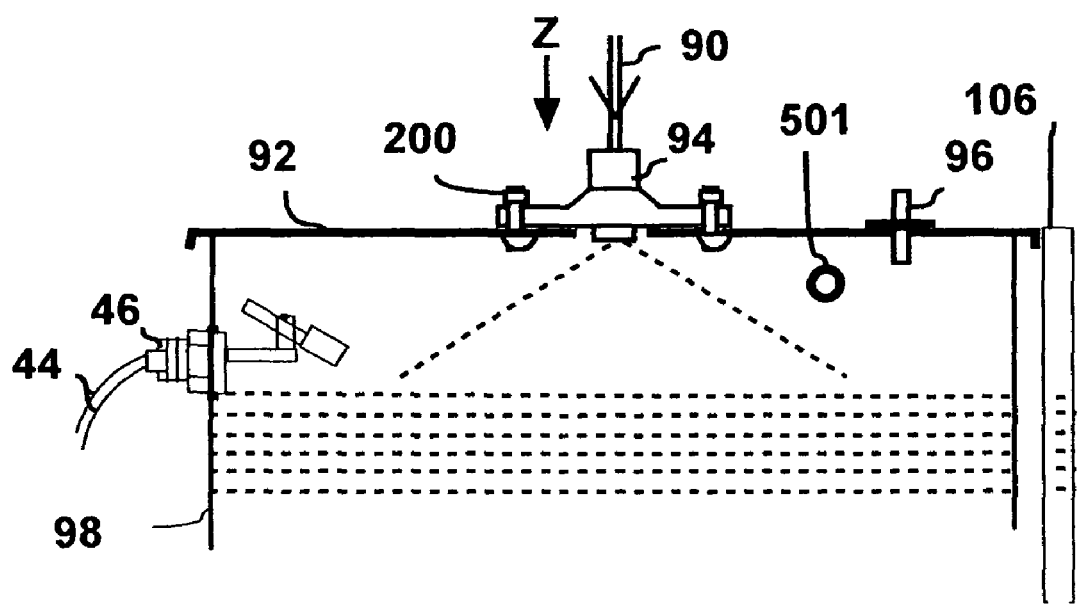
FIG. 2 is a fragmented side elevation view of a nutrient tank.

FIG. 2 is a fragmented side elevation view of a preferred embodiment of nutrient tank 98. An inverted flush sprinkler head 94 receives nutrient Z through fitted piping tubing 90, and is placed over an aperture cut in the middle of the nutrient tank cover 92 and attached using fasteners 200. Nutrient level in the nutrient tank 98 can be observed by viewing the nutrient level in clear tubing 106. A supplemental pressurized water supply 501 is connected to nutrient tank 98 for nutrient Z dilution.

In another embodiment of the present invention, full strength nutrient Z is feed to pressure dispenser 20, and simultaneously half strength nutrient Z is feed to gravity dispenser 15. An advantage to using pressure dispenser 20, gravity dispenser 15 feeding plants simultaneously using different nutrient Z concentrations is that starter plants may require nutrient Z at half the concentration feed to mature fruit bearing plants. Referring to FIGS. 1 and 2, gravity dispenser 15 feeding starter plants with half strength nutrient Z is accomplished by ensuring that timer 30 is turned on and observing the sight tube 106, when the nutrient tank 98 level is half full of nutrient Z, use valve 72 to connect pressurized water supply 500 to pressure dispenser 20. Supplemental pressurized water supply 501 is then turned on to fill the nutrient tank 98 diluting the nutrient Z concentration to half strength. When nutrient tank 98 is full, supplemental pressurized water supply 501 is turned off.

In terms of use, a method for feeding plants with both full and half concentration nutrient Z includes: (refer to the method described above)

in step (b), nutrient dispensing system 10 further including;
a nutrient Z;
gravity dispenser 15 including a nutrient tank 98 for storing nutrient Z;
a supplemental pressurized water supply 501 connected to nutrient tank 98;

ensuring that timer 30 is turned on thereby allowing water to flow from pressurized water supply 500;

in step (c), using valve 72 to connect pressurized water supply 500 to gravity dispenser 15 thereby causing nutrient Z to flow into nutrient tank 98;

when nutrient tank 98 is about half full, using valve 72 to connect pressurized water supply 500 to pressure dispenser 20, and;

causing supplemental water supply 501 to fill nutrient tank 98.

Figure 3:
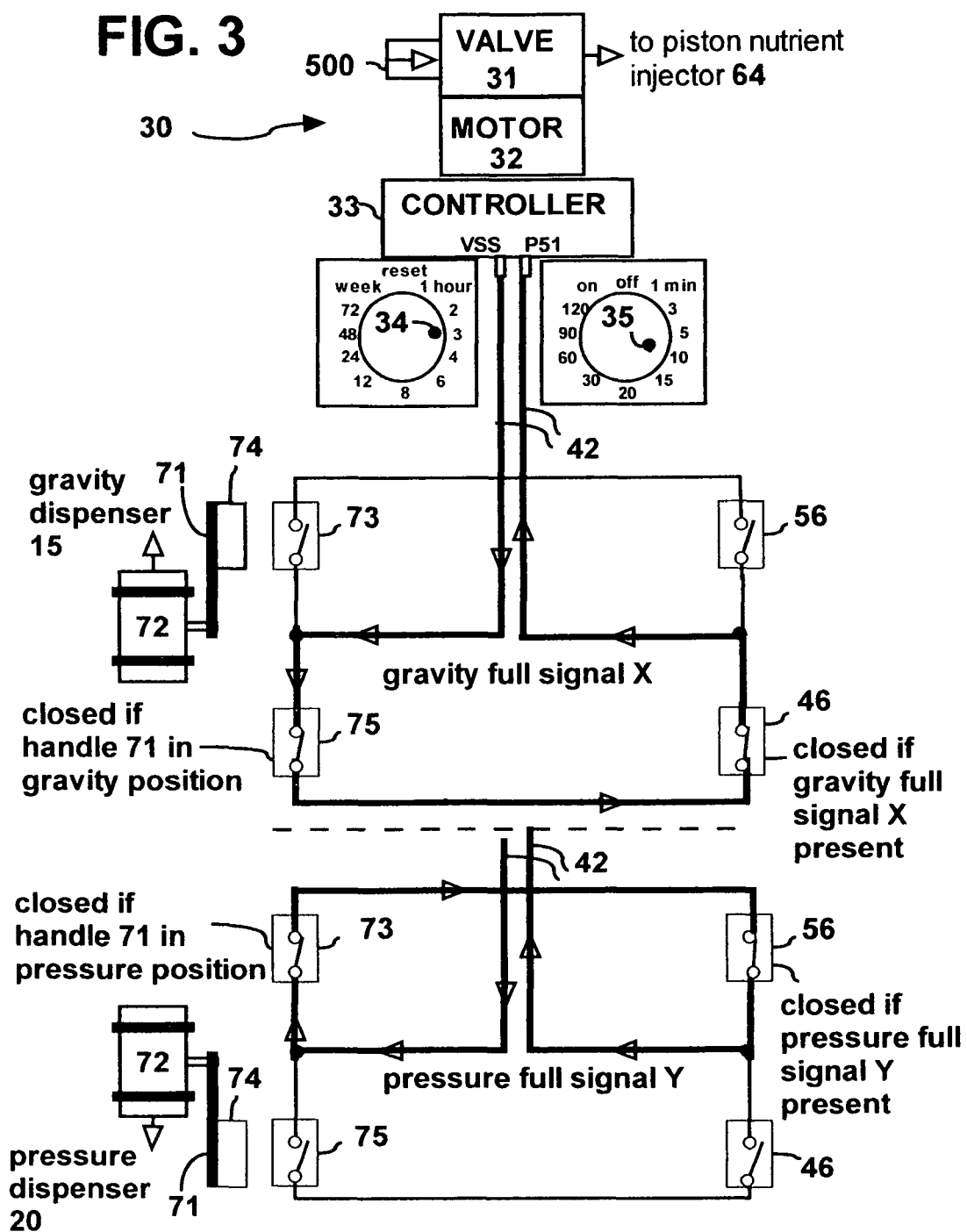
FIG. 3 is a functional diagram showing timer operation.

FIG. 3 is a functional diagram showing electronic tap timer 30 operation. The grower sets the times when electronic tap timer 30 turns on, thereby connecting pressurized water supply 500 to gravity dispenser 15, by rotating frequency rotary switch 34. The grower also sets run time switch 35. The frequency and run time settings are made by the grower based on the nutrient tank size and the number of plants and the plant feeding rate. For example, for a certain type and number of plants, the grower might use frequency rotary switch 34 to set a watering frequency of 12 hours, and use run time switch 35 to set a run time of 30 minutes. Therefore, timer 30 will turn on every 12 hours, and remain on for 30 minutes. It is noted however, that if the timer is on, it will be immediately turned off it receives a gravity full signal X from gravity float switch 46, or a pressure full signal Y from pressure float switch 56.

Referring to Table 1, if timer 30 run time setting is 30 minutes it would capable of filling an 80 gallon nutrient tank with a supply pressure of 60 PSI. If the tank size were increased the run time would need to be increased. Refer to Table 1 for recommended run times based on nutrient tank size and inlet pressure.

The frequency setting is needed to conserve battery life of the timer 30. In an alternate mode of operation, run time switch 35 has an "on" position. In the on position, timer 30 is always on unless a gravity full signal X is received. That is, turning the timer 30 to the on position causes cycling on and off from the gravity full signal X routed from float switch 46. Similarly, if run time switch 35 is in the on position, timer 30 is always on unless a pressure full signal Y is received.

Data gathered while testing the gravity dispenser 15 feeding plants are shown in Table 2. For example, the frequency setting of 3 hours is selected, gravity dispensing 126 gallons of nutrient Z in a week with estimated battery life of 18 weeks, feeding 24 large pots from a five gallon nutrient tank.

TABLE 1

Electronic tap timer run time setting
Nutrient tank - Gallons of nutrient filled under variable run time settings

| Electronic tap timer | Pressurized water supply = 20 PSI | | Pressurized water Supply = 40 PSI | | Pressurized Water Supply = 60 PSI | |
|---|---|---|---|---|---|---|
| run time switch setting minutes | Fill Gallons | Maximum Nut. tank size | Fill Gallons | Maximuim Nut. tank size | Fill Gallons | Maximum Nut. tank size |
| 1 | 1.32 | 1 | 1.96 | 2 | 2.65 | 2.5 |
| 3 | 3.96 | 4 | 5.88 | 6 | 7.95 | 8 |
| 5 | 6.6 | 6 | 9.8 | 10 | 13.25 | 13 |
| 10 | 12.2 | 12 | 19.6 | 20 | 26.5 | 26 |
| 15 | 19.8 | 20 | 29.4 | 30 | 39 | 40 |
| 20 | 26.4 | 26 | 39.2 | 40 | 53 | 50 |
| 30 | 39.6 | 40 | 58.8 | 60 | 79.5 | 80 |
| 60 | 79.2 | 80 | 117.6 | 120 | 159 | 160 |
| 90 | 118.8 | 120 | 176.4 | 180 | 238.5 | 240 |
| 120 | 158.4 | 160 | 235.2 | 240 | 318 | 320 |

TABLE 2

Electronic tap timer frequency setting and results -
Nutrient tank size 5 gallons
Plants feeding 12 hours out of 24 hours

| Electronic tap timer frequency switch setting hours | Gallons of nutrient available to be dispensed weekly | Electronic tap timer battery life/weeks estimated | Number of large pots feed from a five gallon nutrient tank |
|---|---|---|---|
| 1 | 378 | 6 | 72 |
| 2 | 189 | 12 | 36 |
| 3 | 126 | 18 | 24 |
| 4 | 94.5 | 24 | 18 |
| 6 | 63 | 36 | 12 |
| 8 | 47.25 | 48 | 9 |
| 12 | 31.5 | 72 | 6 |
| 24 | 15.75 | 144 | 3 |
| 48 | 7.87 | 288 | 1.5 |
| 72 | 5.25 | 434 | 1 |
| 168 | 2.24 | 1008 | 0.5 |

In an embodiment of the invention, electronic tap timer 30 is model AL005 manufactured by AquaLean Manufacturing Co., 10-1f, Jhong-Shan North Road, Taipei, ROC.

Returning again to FIG. 3, timer 30 is controlled by an 8 bit micro-controller 33 designed for low power 3 volt battery operation. Gravity full signal X and pressure full signal Y are routed to timer 30 by leads 42 causing input P51 to switch logic low by connecting to battery negative identified as VSS. The controller's 33 input P51 is programmed to close the water valve 31 using DC motor 32 and maintain the water valve 31 closed until gravity full signal X and pressure full signal Y are removed disconnecting VSS from Input P51.

Frequency can be set using the rotary switch 34 and run time 35, including on and off. As can be seen from FIG. 3, in the shown embodiment gravity full signal X and pressure full signal Y are in reality switch closures coming from gravity float switch 46 and pressure float 56 respectively. In the shown embodiment, magnet 74 is attached to handle 71 of valve 72, and opens normally closed pressure magnetic contact 73 disconnecting pressure full signal Y, when handle 71 is in the gravity dispenser 15 position. Similarly, magnet 74 opens normally closed gravity magnetic contact 75 disconnecting gravity full signal X, when handle 71 is in the pressure dispenser 20 position. It is noted that in FIG. 3, the connection of timer 30 to gravity dispenser 15 is shown, with the circuitry repeated and the alternative connection to pressure dispenser 20 shown below. It may be appreciated that the routing of gravity full signal X and pressure full signal Y via the position of valve 72 could be implemented in other ways.

Figure 4:
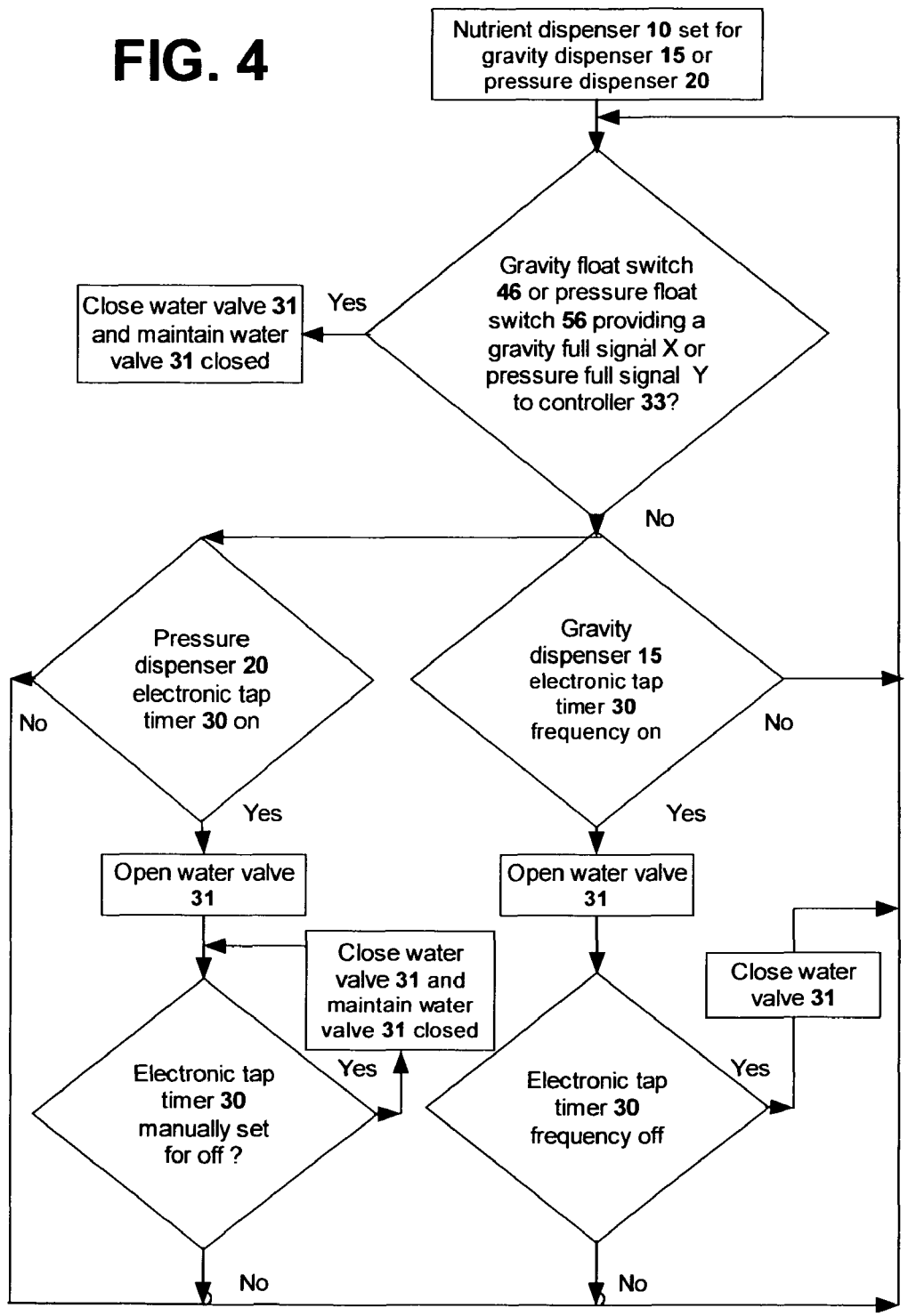
FIG. 4 is a logic diagram of the timer.

FIG. 4 is a logic diagram of the timer 30, showing controller 33 input P51. Also, referring to FIG. 3, gravity float switch 46 or pressure float switch 56 provides a gravity full signal X or pressure full signal Y respectively to input P 51 of controller 33 causing water valve 31 to close and maintain water valve 31 closed. Water valve 31 is maintained closed until gravity float switch 46 and pressure float switch 56 changes state removing gravity full signal X and pressure full signal Y from input P51 of controller 33.

The preferred embodiments of the invention described herein are exemplary and numerous modifications, variations, and rearrangements can be readily envisioned to achieve an equivalent result, all of which are intended to be embraced within the scope of the appended claims.

I claim:

1. A nutrient dispensing system which connects to a pressurized water supply, the nutrient dispensing system comprising:
    a gravity dispenser;
    a pressure dispenser;
    a valve which selectively connects the pressurized water supply to one of said gravity dispenser and said pressure dispenser;
    a timer which controls water flow from the pressurized water supply;
    said gravity dispenser including a nutrient tank for storing a nutrient;
    a gravity float switch disposed in said nutrient tank said gravity float switch providing a gravity full signal when said nutrient tank is full of said nutrient; and,
    said gravity full signal routed to said timer causing said timer to turn off.

2. The nutrient dispensing system according to claim 1, further including:
    said timer only causing water to flow from the pressurized water supply to said gravity dispenser during selectable pre-determined periods.

3. The nutrient dispensing system according to claim 1, further including:
    a supplemental pressurized water supply connected to said nutrient tank.

4. A nutrient dispensing system which connects to pressurized water supply, the nutrient dispensing system comprising:
    a gravity dispenser;
    a pressure dispenser;
    a valve which selectively connects the pressurized water supply to one of said gravity dispenser and said pressure dispenser;
    a timer which controls water flow from the pressurized water supply;
    said pressure dispenser including a nutrient reservoir for storing a nutrient;
    a pressure float switch disposed in said nutrient reservoir, said pressure float switch providing a pressure full signal when said nutrient reservoir is full of said nutrient; and,
    said pressure full signal routed to said timer causing said timer to turn off.

5. The nutrient dispensing system according to claim 4, further including:
    said timer being turned on causing water to flow from the pressurized water supply to said pressure dispenser unless said pressure full signal is received.

6. A nutrient dispensing system which connects to a pressurized water supply, the nutrient dispensing system comprising:
    a gravity dispenser;
    a pressure dispenser;
    a valve which selectively connects the pressurized water supply to one of said gravity dispenser and said pressure dispenser;
    a first mode of operation in which said gravity dispenser only is in use;
    a second mode of operation in which said pressure dispenser only is in use;
    a third mode of operation in which said gravity dispenser and said pressure dispenser are simultaneously in use;
    exactly one timer which controls water flow from the pressurized water supply to both said gravity dispenser and said pressure dispenser;
    said gravity dispenser including a nutrient tank for storing a nutrient;
    a gravity float switch disposed in said nutrient tank, said gravity float switch providing a gravity full signal when said nutrient tank is full of said nutrient;
    said gravity full signal routed to said timer causing said timer to turn off;
    said pressure dispenser including a nutrient reservoir for storing said nutrient;
    a pressure float switch disposed in said nutrient reservoir, said pressure float switch providing a pressure full signal when said nutrient reservoir is full of said nutrient; and,
    said pressure full signal routed to said timer causing said timer to turn off.

7. A method for feeding plants, comprising:
    (a) providing a pressurized water supply;
    (b) providing a nutrient dispensing system connected to said pressurized water supply, said nutrient dispensing system including:
        a gravity dispenser;
        a pressure dispenser;
        a valve which selectively connects said pressurized water supply to one of said gravity dispenser and said pressure dispenser;
        a nutrient;
        a timer which controls water flow from said pressurized water supply;
        said gravity dispenser including a nutrient tank for storing said nutrient;
        a gravity float switch disposed in said nutrient tank, said gravity float switch providing a gravity full signal when said nutrient tank is full of said nutrient;
        said gravity full signal routed to said timer causing said timer to turn off;
    (c) ensuring that said timer is turned on thereby allowing water to flow from said pressurized water supply;

(d) using said valve to connect said pressurized water supply to said gravity dispenser thereby causing said nutrient to flow into said nutrient tank; and,
(e) when said nutrient tank is full of said nutrient, said gravity full signal causing said timer to turn off.

8. The method of claim 7, further including:
in step (b), said timer causing water to flow from said pressurized water supply to said gravity dispenser during selectable pre-determined periods.

9. A method for feeding plants, comprising:
(a) providing a pressurized water supply;
(b) providing a nutrient dispensing system connected to said pressurized water supply, said nutrient dispensing system including:
a gravity dispenser;
a pressure dispenser;
a valve which selectively connects said pressurized water supply to one of said gravity dispenser and said pressure dispenser;
a nutrient;
a timer which controls water flow from said pressurized water supply;
said pressure dispenser including a nutrient reservoir for storing a nutrient;
a pressure float switch disposed in said nutrient reservoir, said pressure float switch providing a pressure full signal when said nutrient reservoir is full of said nutrient; and,
said pressure full signal routed to said timer causing said timer to turn off;
(c) ensuring that said timer is turned on thereby allowing water to flow from said pressurized water supply;
(d) using said valve to connect said pressurized water supply to said pressure dispenser, thereby causing said nutrient to flow into said nutrient reservoir; and,
(e) when said nutrient reservoir is full of said nutrient, said pressure full signal causing said timer to turn off.

10. The method of claim 9, further including:
in step (b), said timer being turned on causing water to flow from the pressurized water supply to said pressure dispenser unless said pressure full signal is received.

\* \* \* \* \*